Nov. 16, 1948.         H. O. DAY         2,453,975
PIVOTING HYDRAULIC POWER CYLINDERS FOR DUMP TRUCKS
Filed Aug. 3, 1946                3 Sheets-Sheet 1

INVENTOR:
HERBERT O. DAY
BY
Arthur Middleton
ATTORNEY

Nov. 16, 1948.  H. O. DAY  2,453,975
PIVOTING HYDRAULIC POWER CYLINDERS FOR DUMP TRUCKS
Filed Aug. 3, 1946  3 Sheets-Sheet 2

INVENTOR:
HERBERT O. DAY
BY
Arthur Middleton
ATTORNEY

Nov. 16, 1948.   H. O. DAY   2,453,975
PIVOTING HYDRAULIC POWER CYLINDERS FOR DUMP TRUCKS
Filed Aug. 3, 1946   3 Sheets-Sheet 3
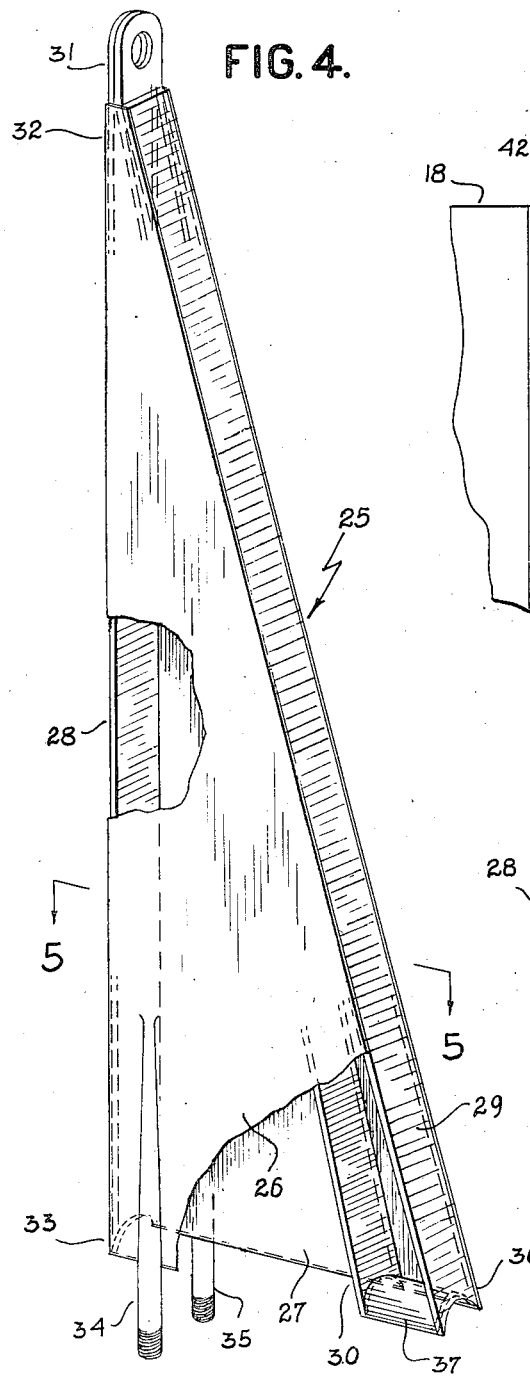
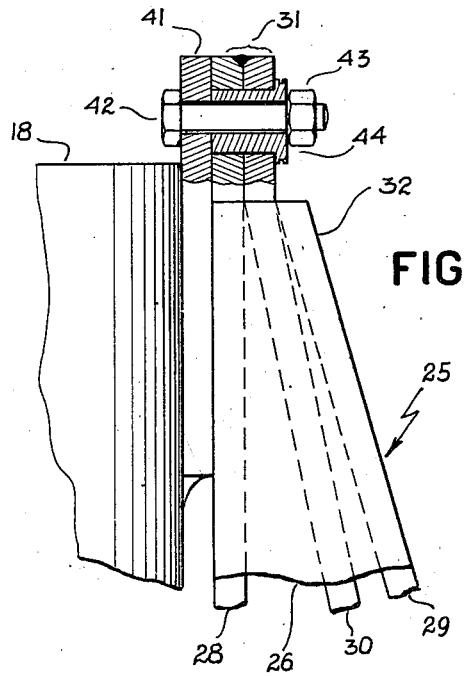
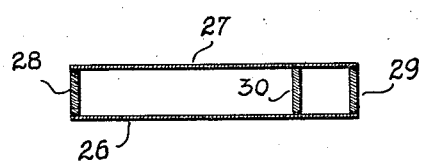
FIG. 4.
FIG. 6.
FIG. 5.
INVENTOR:
HERBERT O. DAY
BY
Arthur Middleton
ATTORNEY Patented Nov. 16, 1948

2,453,975

UNITED STATES PATENT OFFICE 2,453,975

PIVOTING HYDRAULIC POWER CYLINDER FOR DUMP TRUCKS

Herbert O. Day, Bowling Green, Ohio

Application August 3, 1946, Serial No. 688,386

13 Claims. (Cl. 121—63)

This invention relates to hydraulic power or hoist cylinders, hydraulic jacks, or telescoping jack devices, and more particularly to those that are swingably mounted and are thus capable of moving a swingable load.

Further particularized, this relates to improvements in the kind of power cylinder that is mounted upon and extends transversely with respect to a shaft member, to be swingable about the axis of that shaft member, while a reciprocable piston rod in the cylinder is being extended or retracted.

For example, such a structural assembly unit of hydraulic power cylinder and transverse shaft member may serve in actuating the tiltable body of dump trucks, in which case the shaft member extends across and is journalled upon the chassis frame of the truck. Hence the shaft member will herein also be termed the cross shaft member.

A problem exists in so mounting the cylinder upon the cross shaft member that undesirable power stress reactions from the cylinder upon the shaft member, especially undesirable bending stresses due to centrally concentrated transverse load upon the shaft member are minimized or avoided. So it is an object of this invention to solve that problem by devising means to preclude force reactions from the cylinder to be imposed or concentrated upon the middle portion of the shaft member by distributing or spreading the transverse reaction force or load along the length of the shaft member or to transmit it to points as close as possible to the journal-supported end portions of the shaft member. In some respects this problem is illustrated in my Patent No. 2,210,142 of August 6, 1940, filed October 12, 1937.

Although this invention is herein shown to be embodied in the tilting mechanism of a dump truck, that embodiment is not to be considered as limiting with respect to other fields of application. For example, the improved construction may serve in swingably raising and lowering the boom of a vehicular crane.

According to this invention, I provide at each side of the cylinder a stiffener or rib-like load-transmitting or bracing member. Each bracing member is thus disposed substantially in a plane with the axes of the cylinder and of the shaft member representing a three-cornered structure, the two base corner portions of which are fastened to respective points of the adjacent portion of the cross shaft member, while the third corner portion is fastened to the free or forward end portion of the cylinder. Adjustable means are provided for individually fitting or tensioning each bracing member when the same is being mounted in place.

The hydraulic power cylinder mounted upon the cross shaft member, together with the force-transmitting bracing members, constitutes an assembly unit which will herein briefly be termed the swingable cylinder unit, or simply the cylinder unit.

According to one feature, the three-cornered bracing member is in the nature of a box structure or rectangular triangle. According to another feature, the adjustable means comprise an eccentric device. According to still another feature, the base edge portion of the triangular box structure or bracing member is shaped to hug the adjacent circumferential portion of the shaft member, whereby it aligns itself with the shaft member. Suitable clamping or anchoring means surround the shaft member in connecting the box structure thereto.

The best embodiment of the invention now known to me has been chosen for illustration purposes, but it should in no sense be taken as limiting because obviously the invention is capable of other embodiments with changes both in detail and construction, so long as they do not depart from the ambit of the appended claims.

In the drawings:

Fig. 4 is a perspective detail view of one of the load-transmitting bracing members;

Fig. 5 is a cross-section on line 5—5 of Fig. 4; and

Fig. 6 is an enlarged sectional view of the adjustable mounting means for the load-transmitting bracing member.

Figure 1:
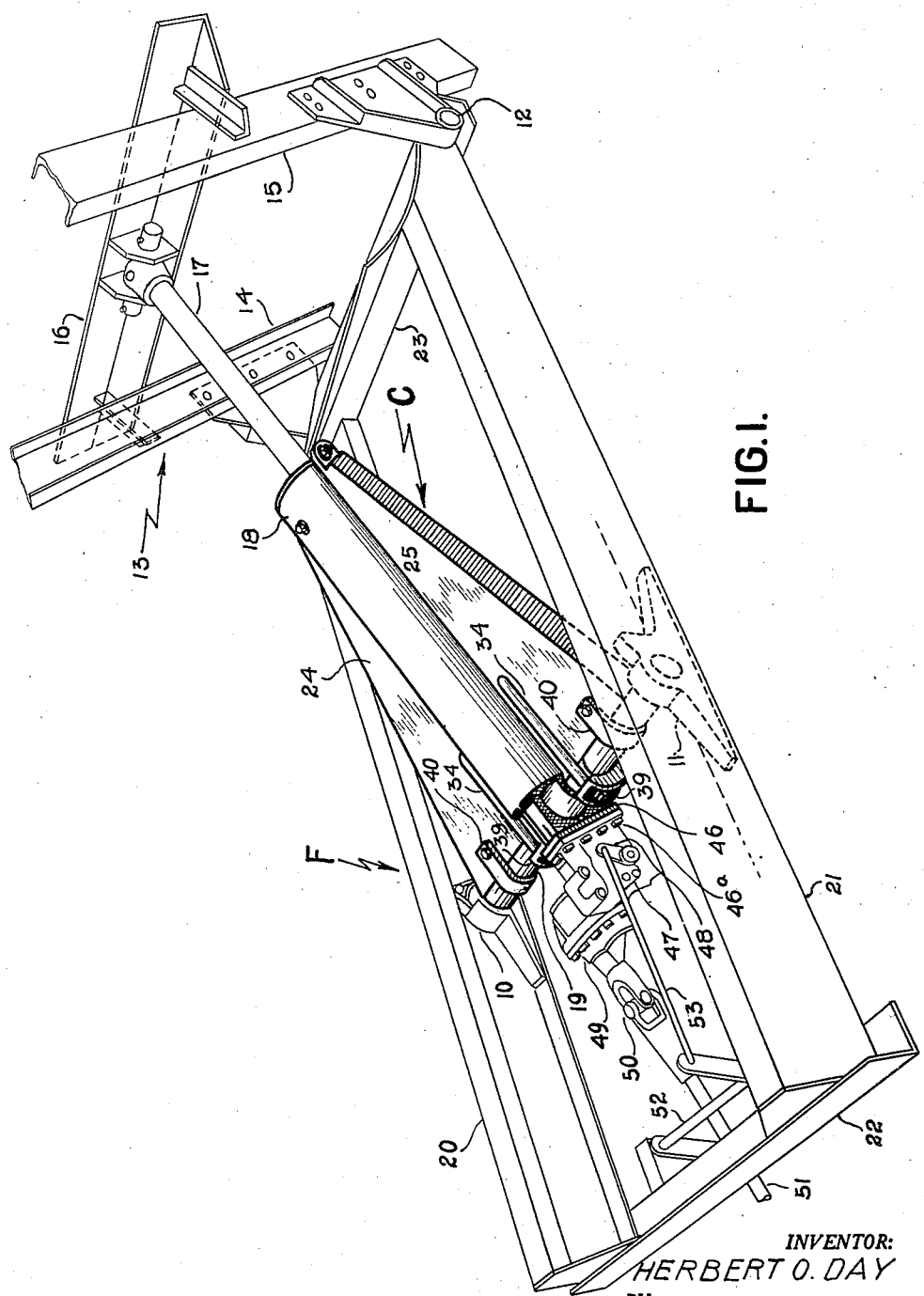
Figure 1 is a perspective view of the power cylinder mounted upon the chassis of a dump truck.

Environmentally, the swingable cylinder unit C is shown in Fig. 1 to be mounted by means of journals 10 and 11, upon the chassis frame F of a dump truck, to serve in tilting the body thereof when dumping a load therefrom. The rear end of the chassis frame F has swingably mounted thereon as at 12, a tiltable body 13 fractionally indicated by longitudinal members 14 and 15 and a cross member 16 to which attaches the piston rod 17, which is extendable from, and retractable into, the cylinder 18 proper of the cylinder unit C.

Through a bore 18ª (see Figs. 2 and 3) in the rear end 18ᵇ of the cylinder 18, extends a cross shaft member 19, the ends of which are rotatable in the journals 10 and 11 mounted upon the inside of longitudinal members 20 and 21 of the frame F rigidly interconnected as by cross members 22 and 23.

Figure 2:
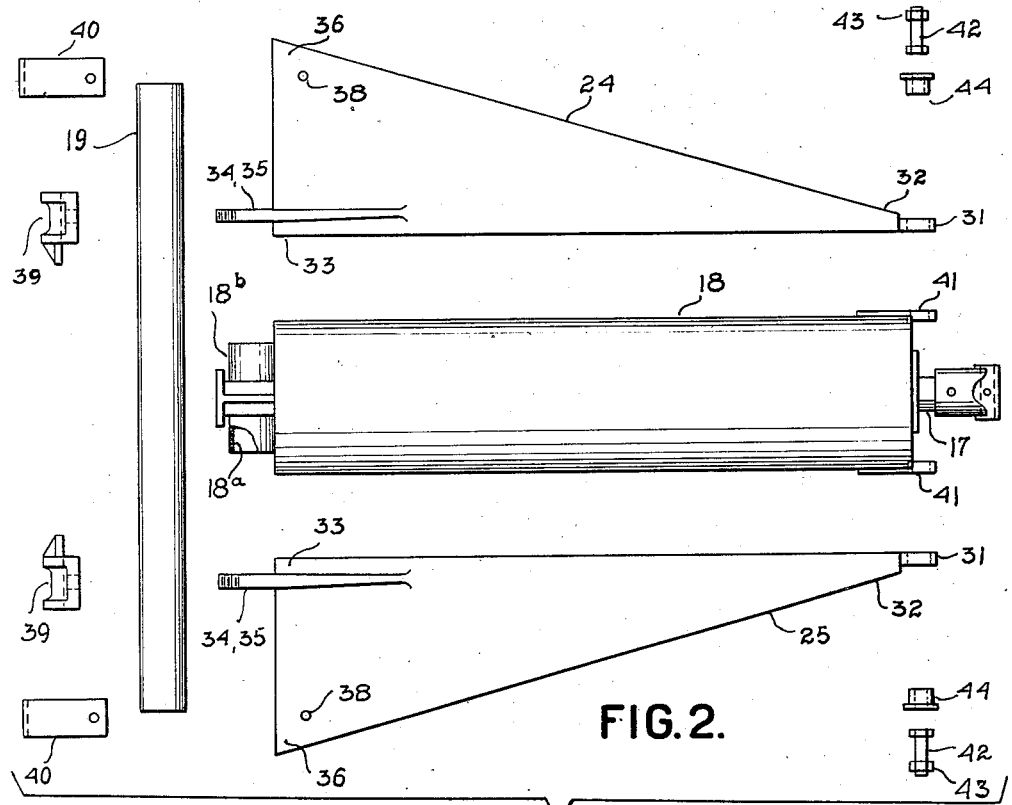
Fig. 2 is an exploded plan view of the cylinder unit.
Figure 3:
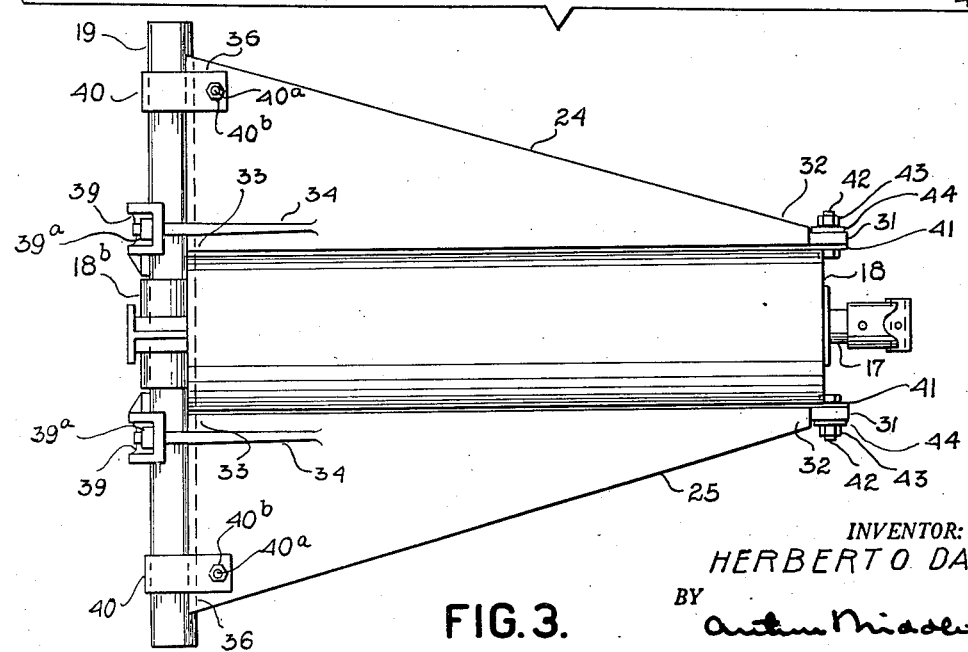
Fig. 3 is a plan view of the cylinder unit.

As shown in Figures 1, 2 and 3, the cylinder unit C comprises a pair of force-transmitting bracing members 24 and 25 of triangular shape although of box-like construction, more clearly shown in the enlarged part-sectional detail perspective of Fig. 4. The box structure is welded and comprises a top plate 26 and an identical bottom plate 27 in the shape of a rectangular triangle, a pair of converging side walls 28 and 29, and an intermediate wall or rib 30 converging with the side walls. The side wall 28 and the intermediate rib 30 together terminate in a tab or eye portion 31 to serve in anchoring the first or pointed or forward end or corner portion 32 of the bracing member to the front end portion of the cylinder 18.

At or near the second or right-angle corner 33 of the box shape there is provided a pair of bolts 34 and 35 welded respectively to the top plate 26 and the bottom plate 27. At the third or outer corner portion 36 of the box shape there is provided a halfshell bearing or rest portion 37 welded to and extending between the diverging ends of the side wall 29 and the intermediate wall or rib 30, and incidentally also welded to the top and bottom plates 26 and 27. The outer corner portions of the triangular top and bottom plates are also provided with registering bolt holes 38.

The wide rear end portion of each of the triangular box-like bracing members is fastened to the cross shaft member 19 by a half-shell clamping member 39 slipped over the bolts 34 and 35 and held tight by a pair of nuts 39ª. The outer corner portion of each bracing member is held in place relative to the cross shaft member 19 by means of a U-shaped steel band 40, having a fastening bolt 40ª extending through the bolt holes 38 and a nut 40ᵇ.

The pointed or forward corner portion 32 of each bracing member is fastened to a corresponding forward end portion of the cylinder 18, namely to an eye portion 41 welded to the cylinder and associated with the eye portion 31 of the bracing member. Referring more specifically to the detail in Fig. 6, the means for this fastening comprise a through-bolt 42 with nut 43, which bolt extends through an eccentric bushing 44 which is rotatably fitted into the eye portion 31 of the bracing member.

In assembling the component parts which constitute the cylinder unit C, the cross-shaft member 19 is first inserted into, and positioned in, the transverse bore 18ª of the cylinder proper. The bracing members 24 and 25 are then added by first positoning and fastening the wide or rear-end portion thereof upon the corresponding portions of the cross shaft member 19, and then fastening the pointed or forward-corner portion 32 to the front-end portion of the cylinder. A tight fitting and unitary rigid connection or junction of the bracing members with the cylinder and with the cross shaft member can then be effected by turning the eccentric bushing 44 until tight, and then tightening the nut 43 upon the bolt 42. In this manner a solid and exceedingly strong unitary structure is created from the component parts comprising the cylinder 18, the cross shaft member 19, and the bracing members 24 and 25, through which unfavorable stresses upon the cross shaft member are effectively absorbed and transmitted to the journals 10 and 11.

The rear end of the cylinder 18 has a rectangular flange portion 46 to which is bolted as at 46ª a hydraulic control or master valve unit 47 having a central lever 48 to operate the power cylinder 18. A pump 49 to furnish the hydraulic pressure fluid is shown to be unitary with the control valve 47, being driven through a universal joint 50 by a shaft 51 from the truck engine (not shown). Suitable ports and flow passages connect the valve unit 47 with the power cylinder and with a reservoir, but are not specifically shown. The valve control lever 48 may be actuated from the driver's seat as through crank shaft 52 being linked to the control lever 48 by a rod 53.

When adjusting the eccentric bushing, it may be turned in one direction whereby the cylinder is placed under compression stress and the bracing member under tension stress; or the bushing may be turned in the opposite direction whereby the stress relationship is reversed, placing the cylinder under tension stress and the bracing member under compression stress. By adjusting in the last mentioned manner, the force reaction from the power cylinder and from the piston rod is more assuredly transmitted through the bracing members to the respective end portions of the cross shaft member.

The cross-shaft 19 has a loose fit in the bore 18ª. The fit may be loose enough to allow for squaring the shaft with respect to the longitudinal axis of the cylinder 18 in case there be a manufacturing inaccuracy in the squareness of the bore 18ª with respect to the cylinder axis. Such adjustment to insure squareness can be effected by making requisite rotary adjustments upon the eccentrics 44. Such adjustability is desirable for example when the bore 18ª is provided by casting, since extra machining of the bore can thus be avoided.

It will be noted in the perspective view of Fig. 1 that the parts pertaining more directly to the invention have been accentuated by heavier lines and shading, while the more environmental parts have been toned down by lighter lines or by omitting the shading.

I claim:

1. A hydraulic jack device comprising a hydraulic power cylinder swingable about an axis extending transversely of the longitudinal axis of the cylinder, a transverse shaft member extending at right angles to the cylinder and associated with the rear-end portion thereof, a pair of bracing members extending substantially in the plane defined by the cylinder and the shaft member, rearward means for fastening the rear-end portion of each bracing member to the shaft member, and forward means for fastening the forward end of each of said bracing members to a corresponding forward portion of the cylinder comprising means for adjusting the relative longitudinal tension between the cylinder and the bracing member.

2. A hydraulic jack device according to claim 1, in which the fastening means comprise a clamp device adjacent the cylinder and another clamp device laterally spaced therefrom.

3. A jack device according to claim 1, in which the tension-adjusting means comprise an eccentric member.

4. A jack device according to claim 1, in which the forward fastening means and the tension-adjusting means comprise a transversely extending fastening bolt and an eccentric bushing surrounding the bolt.

5. A jack device according to claim 1, in which the bracing member is of triangle form and in which the base of the triangle is associated with the shaft member and the tip is associated with the forward end portion of the cylinder.

6. A jack device according to claim 1, in which the rear-end portion of the cylinder has a transverse bore for receiving the shaft member.

7. A hydraulic jack device comprising a hydraulic power cylinder swingable about an axis extending transversely of the longitudinal axis of the cylinder, a transverse shaft member extending at right angles to the cylinder and associated with the rear-end portion thereof, a pair of bracing members in the form of box structures extending substantially in the plane defined by the cylinder and the shaft member, rearward means for fastening the rear-end portion of each box structure to an associated portion of the shaft member, and forward means for fastening the forward end of each of said bracing members to a corresponding forward portion of the cylinder.

8. A jack device according to claim 7, in which the box structure is of triangular shape of which the base is co-extensive with the shaft member while the tip is associated with the forward end portion of the cylinder.

9. A jack device according to claim 7, in which the box structure is of triangular shape of which the base is co-extensive with the shaft member while the tip is associated with the forward end portion of the cylinder and includes a triangular top plate, a similar triangular bottom plate, and a pair of side walls converging at the tip of the triangle.

10. A jack device according to claim 7, in which the box structure comprises a box structure of triangular shape of which the base is co-extensive with the shaft member and is shaped to partially hug the same.

11. A jack device according to claim 7, in which the box structure is of triangular shape, the base of which is co-extensive with the shaft member, and in which the fastening means for said base comprise clamping means surrounding said shaft member.

12. A jack device according to claim 7, in which the box structure is of triangular shape, the base of which is co-extensive with the shaft member, said box structure comprising a triangular top plate, a similar triangular bottom plate, and a pair of side plates converging toward the tip of the triangle, whereby the base portion adjoining the shaft member remains substantially open.

13. A jack device according to claim 7, in which the rear-end portion of the cylinder is provided with a transverse bore for receiving the shaft member.

HERBERT O. DAY.

REFERENCES CITED

The following references are of record in the file of this patent:

UNITED STATES PATENTS

| Number | Name | Date |
| --- | --- | --- |
| 1,750,833 | Carns | Mar. 18, 1930 |
| 2,210,142 | Day | Aug. 6, 1940 |
| 2,234,134 | Barrett | Mar. 4, 1941 |
| 2,416,045 | Chapman | Feb. 18, 1947 |